United States Patent Office 3,551,387
Patented Dec. 29, 1970

3,551,387
PROCESS FOR PREPARING POLYESTER RESINS FROM AROMATIC DINITRILES
Ralph Landau, Northport, N.Y., assignor to Halcon International, Inc., a corporation of Delaware
No Drawing. Continuation of application Ser. No. 638,580, May 15, 1967. This application Aug. 14, 1969, Ser. No. 850,264
Int. Cl. C08g 17/003
U.S. Cl. 260—75                5 Claims

ABSTRACT OF THE DISCLOSURE

This invention relates to a process for the preparation of materials suitable for conversion, by polymerization techniques, to polyester resins. More particularly, this invention relates to the preparation of materials suitable for conversion to polyester resins from aromatic dinitriles. In a particularly preferred embodiment, this invention relates to the production of such polyester resins employing terephthalonitrile as the starting material.

CROSS REFERENCE TO RELATED APPLICATION

This application is a continuation of co-pending application, Ser. No. 638,580 filed May 15, 1967, now abandoned.

BACKGROUND

Polyester resins include a wide variety of resinous materials, i.e., resinous materials derived by the polymerization of a large number of monomeric substances. Of these, the most important, commercially, is that polyester resin which is obtained by the polymerization of bis (2-hydroxyethyl) terephthalate. Hence, in the following discussion, the background and the description of the present invention will be presented in terms of bis (2-hydroxyethyl) terephthalate and polyester resins obtained by polymerization thereof. However, this invention is applicable to polyester resins employing, as the monomeric materials, the diesters of phthalic acid, isophthalic acid and terephthalic acid as well as the diesters of the mono-methyl substituted derivatives of these acids. The esterifying alcohol component of these diesters is normally ethylene glycol although 1,2-propylene glycol and 1,3-propylene glycol also can be employed. Glycerol is a suitable esterifying alcohol when cross-linked polyester resin products are desired.

The common raw material of commerce for the manufacture of polyester resins is dimethyl terephthalate which is prepared by the oxidation of paraxylene with either nitric acid or molecular oxygen. The dimethyl terephthalate is then converted to the monomeric material for the polyester resin, i.e., bis (2-hydroxyethyl) terephthalate by an ester exchange reaction with ethylene glycol. By-product methanol is recycled to the preparation of dimethyl terephthalate. Excess ethylene glycol present during the ester exchange reaction is recovered and reused. The monomeric material is then polymerized to form the resin product in accordance with the following chemical equation:

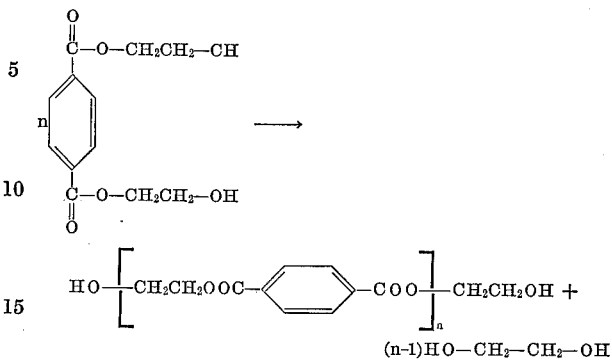

On inspection of the above equation, it will be noted that a substantial amount of ethylene glycol is formed during the polymerization. This ethylene glycol must be removed substantially as fast as it is formed in order to obtain the desired polymer product and this glycol must be recovered and recycled in order to achieve maximum process economies.

While this technology is relatively simply described, numerous problems have been encountered in commercial practice and have largely been solved by dint of many years of extensive research and practical commercial experience. Among the problems that have been involved in this prior art technology are those associated with the removal of trace impurities and the purification of recycled streams of permit reuse, which is essential to the overall economics of polyester resin manufacture.

More recently, processes utilizing new raw materials for the manufacture of polyester resins have been developed. These new raw materials are aromatic dinitriles. Such aromatic nitriles are prepared, for example, by a process known as ammoxidation, i.e., by the simultaneous reaction of a polyalkyl substituted aromatic (e.g., paraxylene) with ammonia and oxygen. One such ammoxidation process capable of producing dinitriles in high yield is carried out in the presence of a solid catalyst maintained in a fluidized state by the gaseous reactants entering the reaction vessel, as disclosed and claimed in U.S. patent application, Ser. No. 533,237, filed Mar. 10, 1966. The aromatic dinitrile product of this ammoxidation reaction is then converted to bis(2-hydroxyethyl) terephthalate by reaction of the dinitrile with water and an excess of ethylene glycol.

However, bis (2-hydroxyethyl) terephthalate prepared by ammoxidation of paraxylene in this manner and that prepared by paraxylene oxidation are not entirely equivalent materials. The precise nature of these differences is not known but appears to be associated with non-saponifiable nitrogenous impurities present in small amounts in the monomer produced in this manner via ammoxidation processes. The term "non-saponifiable nitrogenous impurities" as herein used excludes ammonia and includes those nitrogen-containing impurities which, upon treatment with an aqueous strong alkaline solution (e.g., NaOH), do not yield ammonia. On a once-through basis (i.e., when recycle of intermediate streams is not employed) the amount of these non-saponifiable nitrogenous impurities appear to be too small to adversely affect product polyester resin quality to a significant extent. However, when intermediate recycles, for example of the ethylene glycol formed during the polymerization, are employed, these impurities quickly build up in the monomer to a point which does affect polymer quality. This has been an inhibiting factor in the commercial acceptance of aromatic dinitriles as starting materials in the manufacture of polyester resins.

These impurities initially appear to concentrate in the monomer; thus, the excess glycol required for the conversion of the dinitrile to the monomer can be recovered, recycled, and reused, without resulting in impurities build-up. However, the glycol liberated in the overall polymerization tends to be far richer in these impurities and it is the recycle of this glycol, which is necessary for an economically attractive process, that results in the impurities build-up.

Techniques for purification of the glycol liberated during polymerization already exist, but these techniques are expensive, both to build and to operate. However, heretofore, there has been no alternative to the provision of such facilities for the treatment of the entirety of the glycol liberated during polymerization.

This invention relates to a process improvement which, while it does not obviate the necessity for purification of this recycle glycol, does permit the size of this equipment to be radically reduced, thereby permitting a significant reduction in both capital and operating costs.

SUMMARY OF THE INVENTION

In accordance with this invention, it has been found that facilities for purification of the glycol liberated during the polymerization of the monomeric diester can be reduced substantially in size by first subjecting the monomeric diester to an oligomerization such that the resultant oligomer contains an average of from about 4 to about 20 monomer units. In this manner, from about 75% to about 95% of the total of the ethylene glycol liberated in the overall polymerization (i.e., including both the oligomerization and the final polymerization) is liberated during the oligomerization. Surprisingly, it has been found that the portion of the ethylene glycol, which is liberated during this oligomerization is substantially free of non-saponifiable nitrogenous impurities and requires little or no intermediate purification before reuse.

The resultant oligomer then can be further polymerized in conventional manner to a high molecular weight fiber- or film-forming polyester resin, thereby liberating the remaining 5 to 25% of the recoverable ethylene glycol. Contrary to the situation existing with regard to that portion of the ethylene glycol liberated during the oligomerization, the portion of the ethylene glycol liberated during the final polymerization is relatively rich in impurities and requires extensive purification before reuse. However, purification of the glycol can be accomplished in much smaller facilities than would have been required were no oligomerization employed. This is so simply because only a small portion of the glycol need be so purified.

Also in accordance with this invention is a process wherein an aromatic dinitrile is converted to a diester by reaction of the dinitrile with water and an excess of ethylene glycol; the resulting diester is then concentrated by removal of the excess ethylene glycol and the concentrated diester is then polymerized, with the ethylene glycol liberated in the polymerization being recycled to the step wherein the dinitrile is converted to the diester.

DETAILED DESCRIPTION OF THE INVENTION

Employing the process of this invention, the conversion of aromatic dinitriles to the final fiber or film-forming polyester resins proceeds in at least four steps, the first three of which comprise the process of this invention.

(1) Glycolysis of the aromatic dinitrile with water and excess ethylene glycol to form a mixture of the ethylene glycol diester of the dibasic acid corresponding, in carbon structure, to the dinitrile starting material, e.g., bis (2-hydroxyethyl) terephthalate.

(2) Concentration of the diester by removal of the excess glycol. This ethylene glycol is of high purity and can be reused without extensive purification. The diester product of this step perhaps contains oligomers unavoidably formed during the concentration, but it is substantially free of glycol. The concentrated diester is then ready for polymerization.

(3) Oligomerization of the diester to form a pre-polymer containing an average of from about 4 to about 20 monomer units while substantially simultaneously removing ethylene glycol formed during the oligomerization reaction. The ethylene glycol so removed is about 75% to about 95% of the total ethylene glycol recoverable in the overall polymerization and is suitable for recycle and reuse without extensive purification.

(4) Final polymerization of the oligomer or pre-polymer formed in Step 3 to the ultimate resin product, which is accomplished in conventional manner known to those skilled in the art. The remaining 5% to 25% of the total recoverable ethylene glycol is liberated and removed during this final polymerization. This balance of the recoverable ethylene glycol is comparatively rich in impurities and must be treated for removal of impurities prior to recycle and reuse.

The above described steps shall be referred to in the balance of this specification as "glycolysis," "concentration," "oligomerization" and "polymerization" respectively. Additional steps such as intermediate purifications of the diester can also be employed, and it is advantageous, though not necessary, that they be so employed.

The dinitriles which are converted to monomeric diesters for polyester resin manufacture in accordance with this invention are the monocyclic aromatic dinitriles, i.e., phthalonitrile, isophthalonitrile, and terephthalonitrile and the mono-methyl substituted derivatives of these nitriles. These nitriles are glycolized to form the ethylene glycol diesters of the carboxylic acids corresponding in carbon structure to the dinitrile starting material. Processes for such conversion are known in the art, being disclosed, for example, in Gasson et al., U.S. Pat. No. 2,921,088 and in co-pending application, Ser. No. 570,181, filed Aug. 4, 1966. In accordance with one embodiment of the method of this co-pending application, terephthalonitrile, water and an excess of ethylene glycol over that theoretically required are reacted in the presence of catalytically effective amounts of one or more metals selected from the group consisting of iron, tin and lead. These catalyst metals are usually employed in the form of their compounds. By-product ammonia is removed during or after the reaction, and the product of this step is in the form of a mixture, usually a solution, of bis (2-hydroxyethyl) terephthalate.

Optionally, the mixture of glycol diester and ethylene glycol can then be purified before further processing takes place. It is particularly advantageous to conduct such purifications at this stage in the preparation of polyester resins because the presence of the excess glycol facilitates and simplifies the handling of the monomeric material. Advantageous techniques for the conduct of such purifications are disclosed, for example, in co-pending application, Ser. No. 621,467, filed Mar. 8, 1967. In accordance with the process of this co-pending application, residual metallic residues from the hydrolysis and color bodies are removed by contacting the mixture of the diester and ethylene glycol with a cationic ion exchange resin. Optionally, additional decolorizing employing, for example, an activated carbon contacting step, can be employed. The product of such a purification process still is in the form of a mixture of diester and ethylene glycol, though substantially no metallic residues remain and the mixture has a color which approaches water-white.

The concentration step requires removal of the excess ethylene glycol. This is normally conducted by distillation at atmospheric or subatmospheric pressures. Inert gas stripping agents, e.g., nitrogen, carbon dioxide, methane or the like can be employed to facilitate glycol removal. The distillation for this glycol removal is normally carried out at pressures between about 100 and about 760 mm. Hg absolute, with pressures in the range of about 450 to 600 mm. Hg absolute being preferred. Still-pot temperatures are preferably maintained at or below about 200° C. in order to minimize the amount of oligomerization that occurs during the ethylene glycol removal, although, even under these conditions, a limited amount of oligomerization probably does occur.

Polymerization catalysts are often added to the mixture of monomer and ethylene glycol prior to the concentration step in order to facilitate the dispersion of such catalysts with the monomer, though this is not essential since the polymerization catalysts can be added during the subsequent oligomerization step or, less desirably, even during the final polymerization step. Suitable polymerization catalysts include compounds of antimony, zinc, calcium, cerium, aluminum, titanium and cobalt.

The oligomerization or pre-polymerization step is characteristic of the process of this invention and is conducted by heating the monomer, preferably in the presence of a polymerization catalyst, to a temperature between about 200° C. and about 300° C. Temperatures between about 240° C. and about 275° C. are preferred. This oligomerization is preferably conducted at pressures below atmospheric in order to facilitate removal of the ethylene glycol liberated during the condensation of the monomer units and also to facilitate removal of any ethylene glycol remaining in admixture with the monomer after the concentration step. Pressures between about 200 and about 600 mm. Hg absolute are preferred. The oligomerization reaction time can vary from about 2 minutes to about 120 minutes, with reaction times of 30 minutes to 60 minutes normally being preferred. The oligomerization can be conducted in a batch or in a continuous manner.

The oligomers formed in the pre-polymerization can contain from about 4 to about 20 monomer units, with oligomers containing from about 8 to about 15 monomer units being preferred. The lower limit of the degree of polymerization of the oligomers prepared in accordance with this invention is not critical although it is obviously advantageous that this be as high as possible in order to minimize the amount of ethylene glycol liberated in the final polymerization which glycol requires purification before reuse. However, the upper limit on the degree of polymerization of the oligomers is quite critical. The concentration of impurities in the glycol liberated in the oligomerization remains relatively constant throughout the bulk of the reaction and then appears to rise quite suddenly. Before this sudden rise, extensive glycol purification is not normally required; however, such purification is necessary if oligomerization is allowed to proceed beyond the point at which the impurities level suddenly increases. This upper limit is conveniently measured in terms of the percent of the "total recoverable glycol" liberated during the overall polymerization. "Total recoverable glycol," as herein used, means the total of the glycol formed during the oligomerization as a result of the condensation of the monomer units plus the amount of such glycol liberated during the final polymerization. The upper limit beyond which the oligomerization should not be carried out is such that not more than 95% of the total recoverable glycol is liberated during the oligomerization.

These oligomers can then be further polymerized to form the ultimate resin products. Alternatively, the oligomeric products can be used as such in the manufacture of coating compositions, lacquers and the like. Normally, however, the oligomers will be further polymerized to fiber- and film-forming polymers by, for example, heating under vacuum. Suitable products are obtained, for example, by polymerizing the oligomers in the presence of one or more of the above-mentioned catalysts at temperatures of about 275° C. and absolute pressures of about 1 mm. of mercury until ethylene glycol liberation ceases.

As hereinabove stated, the ethylene glycol liberated during the oligomerization normally need not be purified before reuse. Obviously, however, ethylene glycol liberated during oligomerization can be subjected to some purification before recycle and reuse if desired. This would normally be done only if especially low impurities levels were desired for a particular purpose though, even if provided, such purification facilities could be substantially reduced in size and complexity by employment of the process of this invention.

Ethylene glycol liberated during the final polymerization does require extensive purification. Such purification can be accomplished by redistillation of the ethylene glycol under vacuum. Such re-distillation can be readily accomplished in a distillation column containing from about 6 to about 15 theoretical vapor-liquid contacting stages and operated at a reflux ratio between about 0.5 and about 5 (expressed as mols of liquid reflux returned to the column per mol of net ethylene glycol overhead product). Suitable column pressures are within the range of about 10 mm. Hg to about 100 mm. Hg and when operating at these pressures, suitable column overhead temperatures vary between about 90° C. and about 145° C. An additional treatment of the ethylene glycol with adsorbents, such as activated carbon, before or after this distillation is often desirable.

It is to be understood that the glycolysis, concentration, oligomerization and final polymerization can be conducted in either a batchwise or in a continuous manner. In a preferred embodiment of the process of this invention, the glycolysis, concentration and oligomerization steps are conducted in a continuous manner with the glycol recovered in the concentration step and the glycol liberated in the oligomerization being recycled to the glycolysis step. The glycol recovered during the final polymerization, as pointed out above, requires purificaiton prior to recycle and reuse.

EXAMPLES

The following examples are presented to further illustrate this invention but are not intended as limiting the scope thereof. Unless otherwise indicated, all parts and percents in the following examples are by weight.

Example I

Part A: Glycolysis.—Terephthalonitrile is glycolized by admixing 620 parts of ethylene glycol, 256 parts of terephalonitrile, 72 parts of water and, as catalyst, 5.56 parts of lead chloride ($PbCl_2$). This admixture is then charged to a reactor equipped with a water cooled reflux condenser. The reactor and its content are heated to 200° C. under a pressure of 40 p.s.i.g. and maintained at this temperature and pressure for 6 hours duruing which time the reactor contents are continuously stripped with nitrogen to remove ammonia evolved during the reaction. At the end of this 6-hour period, substantially 100% of the theoretical amount of ammonia is evolved and removed from the reactor.

The reactor contents are then removed from the reactor and the resultant crude mixture is found to contain 56% of bis (2-hydroxyethyl) terephthalate and oligomers thereof with the remaining 44% consisting of ethylene glycol with trace amounts of other unidentified materials. This crude mixture is dark yellow in color.

This mixture of ethylene glycol and bis (2-hydroxyethyl) terephthalate, after being withdrawn from the reactor, is cooled from 200° C. to 120° C. and is then passed through a fixed bed containing 140 parts of a cationic ion exchange resin at a rate such that the residence time of the mixture in contact with the resin is 1 hr. The effluent from the ion exchange bed has much improved color and an undetectably low lead content.

The mixture of ethylene glycol and bis (2-hydroxyethyl) terephthalate is then contacted with 140 parts of activated carbon disposed in a second fixed bed. A temperature of 120° C. and a residence time of 1 hr. are employed. The effluent from this purification is a purified mixture of the terephthalate ester and ethylene glycol. Analysis of this mixture indicates a nitrogen content of less than 800 p.p.m.

To 105 parts of the now purified mixture of bis (2-hydroxyethyl) terephthalate and ethylene glycol, in the form of a solution, is added 0.005 parts of zinc acetate to act as a polymerization catalyst. The catalyst is added at this point to facilitate obtaining uniform dispersion of catalyst and monomer.

Part B: Concentration.—Glycol is removed by distilling the solution at 185° C. and a total pressure of 500 mm. Hg under an inert atmosphere (nitrogen). Analysis of the glycol removed in this manner indicates a non-saponifiable nitrogen content below the limit of detection. The glycol removed in this operation advantageously can be recycled to the hydrolysis of the dinitrile starting material.

Part C: Oligomerization.—When substantially all the glycol is removed, the temperature is rapidly increased to 265° C. and the pressure is lowered to 300 mm. Hg at which conditions oligomerization occurs. The oligomerization is continued for 45 minutes, during which time glycol, liberated in the oligomerization reaction, is taken overhead. At the end of this 45 minute oligomerization period, the resulting prepolymer (or oligomer) product is cooled and found to be in the form of a white solid. The average degree of polymerization of the propolymer is 12. During the oligomerization, a total of 13.3 parts of ethylene glycol are liberated, taken overhead and recovered. Analysis of this ethylene glycol indicates that it contains less than 20 p.p.m. of nitrogen and that it has a satisfactory HCl color test. Nitrogen analyses of the ethylene glycol are performed using the method of Kjeldahl. The HCl color test is a measure of potential color bodies and is carried out by admixing 50 ml. of the ethylene glycol and 0.5 ml. of concentrated HCl. This admixture is heated to boiling, refluxed for 30 seconds at the boiling point and then cooled. The color of the admixture is compared with a platinum-cobalt color standard and is satisfactory if the ethylene glycol color is lighter than 30 platinum-cobalt color units. The glycol recovered during this oligomerization step is thus suitable for recycle to the hydrolysis step without intermediate purification.

Part D:—Final polymerization.—The oligomer from Part C is then further polymerized by heating it to a temperature of 275° C. under a pressure of 1 mm. Hg. The oligomer is maintained under these conditions for a period of 90 minutes. During this period 1.1 parts of additional ethylene glycol are liberated, taken overhead and recovered. Analysis of this ethylene glycol, by the above-described techniques, indicates a nitrogen content in excess of 500 p.p.m. and an unsatisfactory HCl color test. Thus this ethylene glycol is unsuited for recycle and reuse unless intermediate purification is employed.

The polymer product of this step is a fiber- and film-forming polyester resin of excellent quality.

Control.—Example 1 is repeated except that no oligomerization step is employed. Instead, the concentrated monomer from the concentration step (Part B of Example I) is directly polymerized as indicated in Part D of Example I. The same total amount of ethylene glycol, 14.4 parts, is liberated and recovered in this run as was recovered in Example I; however, the glycol recovered here contains 65 p.p.m. of nitrogen and has an unsatisfactory HCl color test. Thus, the entirety of the ethylene glycol liberated in this control must be purified prior to recycle and reuse.

Comparing the results of Example I with the Control clearly illustrates the advantages of this invention. In Example I, only about 8% of the glycol liberated during the overall polymerization (Parts C and D) need be purified while in the Control all this ethylene glycol needs intermediate purification. Thus, the purification facilities for the process of Example I need be only one-twelfth the size of those needed for the Control.

Example II

Example I is repeated employing isophthalonitrile as the starting material in place of terephthalonitrile. Similar results are obtained.

Example III

Example I is repeated employing 284 parts of 2-methylterephtalonitrile in place of the unsubstituted terephthalonitrile of Example I. Similar results are obtained.

Example IV

Example I is repeated employing, in the glycolysis, ethylene glycol recovered during the oligomerization and concentration steps of a previous similar run. This re-used ethylene glycol has not been subjected to intermediate purification. Similar polyester resin product quality is obtained.

Example V

A mixture containing 2 gram moles of terephthalonitrile, 10 gram moles of ethylene glycol, 4 gram moles of water and 0.02 gram moles of lead chloride are refluxed with agitation while continuously sparging 140 liters per hour of $N_2$ (saturated with water at 25° C.) into the mixture, the gas volume being measured at 0° C. and 760 mm. Hg. After 12 hours, ammonia evolution has essentially ceased. The reaction product, which consists essentially of bis (2-hydroxyethyl) terephthalate and some oligomers thereof together with ethylene glycol is purified by treatment with a cationic ion exchange resin and with activated carbon (both treatments at 115° C.).

The product from the above-described glycolysis contains approximately 52.5% of terephthalate ester, 5.1% of oligomer and 42.4% of free ethylene glycol ($H_2O$ free basis). To 100 parts of this product is added 0.01 parts of cerium oxide and the mixture is distilled under vacuum to remove the excess free ethylene glycol. Column overhead conditions in this distillation are approximately 160° C. and 200 mm. Hg.

After this distillation is completed, a small sample (100 parts) of the now-concentrated monomer is polymerized and the ethylene glycol liberated during the polymerization is collected and measured. In this manner, it is determined, approximately 24 parts of ethylene glycol are liberated during the overall polymerization for every 100 parts of monomer polymerized.

Two other 100 part samples of the same monomer are separately oligomerized by heating at 245° C. while maintaining the samples under vacuum (200 mm. Hg). In each case, the ethylene glycol liberated during the polymerization is removed from the polymerizing mass and collected.

Oligomerization of the first sample is stopped after 22.9 parts of ethylene glycol are collected, this corresponding to about 94% of the total ethylene glycol recoverable in the overall polymerization. The ethylene glycol so collected is analyzed and found to contain less than 20 p.p.m. of nitrogen and to have a satisfactory HCl color test. The resulting oligomer has an average degree of polymerization of about 16.

Oligomerization of the second sample is stopped after 23.6 parts of ethylene glycol are collected, this being about 97% of the total ethylene glycol recoverable in the overall polymerization. The ethylene glycol collected in this oligomerization contains about 50 p.p.m. of nitrogen, displays unsatisfactory behavior in the HCl color test and is unsuitable for recycle. The resulting oligomer has an average degree of polymerization of about 32.

This example displays the criticality of the oligomerization step and how quickly the impurities build up in that portion of the ethylene glycol which is liberated in the oligomerization if the oligomerization is allowed to proceed beyond the critical upper limit.

The foregoing description illustrates the methods of this invention whereby the advantages thereof are obtained. It will be understood that modifications and variations thereof may be effected by those skilled in the art without departing from the spirit of my invention. Accordingly it is intended that all matter contained in the above description shall be interpreted as illustrative and not in a limiting sense.

What is claimed is:

1. In the process for converting a monocyclic aromatic dinitrile, selected from the group consisting of the phthalonitriles and mono-methyl substituted derivatives thereof, to a polyester resin, said process comprising the steps of:
 (a) glycolysis of the aromatic dinitrile by reaction thereof with water and ethylene glycol to form the diester of the carboxylic acid corresponding, in carbon structure, to the dinitrile;
 (b) recovery of the diester in concentrated form; and
 (c) polymerization of the diester to the polyester resin wherein ethylene glycol liberated in polymerization is recycled, at least in part, to the glycolysis;
 the improvement which comprises:
  subjecting the diester to an oligomerization by heating the diester to a temperature in the range of from about 200° C. to about 300° C. while maintaining the diester at sub-atmospheric pressures for a period between about 2 minutes and about 120 minutes to form a low molecular weight oligomer prior to final polymerization to form the polyester resin, said oligomer containing an average of from about 4 monomer units to about 20 monomer units while substantially simultaneously removing the ethylene glycol formed during such oligomerization, whereby the ethylene glycol liberated during oligomerization is significantly lowered in impurities contained therein relative to ethylene glycol liberated during final polymerization, said glycol liberated during oligomerization thereby requiring less purification than that liberated during final polymerization.

2. A process in accordance with claim 1 wherein the aromatic dinitrile is terephthalonitrile.

3. A process in accordance with claim 1 wherein the aromatic dinitrile is terephthalonitrile.

4. A process in accordance with claim 1 wherein the sub-atmospheric pressure is between about 200 mm. Hg and about 600 mm. Hg.

5. A process in accordance with claim 3 wherein the sub-atmospheric pressure is between about 200 mm. Hg and about 600 mm. Hg.

References Cited
UNITED STATES PATENTS

| | | | |
|---|---|---|---|
| 2,921,088 | 1/1960 | Gasson et al. | 260—475 |
| 2,973,341 | 2/1961 | Hippe et al. | 260—75 |
| 3,167,531 | 1/1965 | Parker et al. | 260—75 |
| 3,308,153 | 3/1967 | Matsuhisa et al. | 260—475 |
| 3,313,844 | 4/1967 | Matsuhisa et al. | 260—475 |
| 3,393,220 | 7/1968 | Winnick et al. | 260—465 |

WILLIAM H. SHORT, Primary Examiner

L. L. LEE, Assistant Examiner

U.S. Cl. X.R.

260—475